US012664784B2

(12) United States Patent
Gustof et al.

(10) Patent No.: US 12,664,784 B2
(45) Date of Patent: Jun. 23, 2026

(54) SYSTEM AND METHOD FOR RECONFIGURING A SECOND CAMERA BASED ON A FIRST CAMERA

(71) Applicant: MOTOROLA SOLUTIONS, INC., Chicago, IL (US)

(72) Inventors: Grzegorz Gustof, Myslenice (PL); Krzysztof Minior, Rudawa (PL); Marcin Kustra, Cracow (PL); Piotr Furman, Grojec (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 3 days.

(21) Appl. No.: 18/487,149

(22) Filed: Oct. 16, 2023

(65) Prior Publication Data

US 2025/0124712 A1     Apr. 17, 2025

(51) Int. Cl.
*G06V 20/52* (2022.01)
*H04N 23/611* (2023.01)
*H04N 23/69* (2023.01)

(52) U.S. Cl.
CPC .......... *G06V 20/52* (2022.01); *H04N 23/611* (2023.01); *H04N 23/69* (2023.01); *G06V 2201/08* (2022.01)

(58) Field of Classification Search
CPC .. G06V 20/52; G06V 2201/08; H04N 23/611; H04N 23/69
USPC ........ 348/143, 169, 159, 152; 382/103, 118, 382/190, 159
See application file for complete search history.

(56) References Cited

U.S. PATENT DOCUMENTS

| | | | |
|---|---|---|---|
| 8,923,801 B2 | 12/2014 | Fletcher et al. | |
| 9,210,336 B2 * | 12/2015 | Scanlon | H04N 19/167 |
| 9,386,050 B2 | 7/2016 | Oswald | |
| 10,043,079 B2 * | 8/2018 | Kim | G06V 20/47 |
| 10,043,238 B2 | 8/2018 | Bean et al. | |
| 10,645,366 B2 | 5/2020 | Rowell et al. | |
| 10,764,725 B1 * | 9/2020 | Lim | H04W 84/08 |
| 10,902,267 B2 | 1/2021 | Kucharski et al. | |
| 11,036,979 B2 | 6/2021 | Blanco et al. | |
| 11,170,223 B2 * | 11/2021 | Kucharski | G06V 20/54 |
| 11,935,325 B2 * | 3/2024 | Stawiszynski | G06V 30/242 |
| 2008/0258880 A1 * | 10/2008 | Smith | H04L 67/12 |
| | | | 455/404.2 |
| 2013/0021434 A1 * | 1/2013 | Ahiska | H04N 23/661 |
| | | | 348/E5.078 |

(Continued)

FOREIGN PATENT DOCUMENTS

| | | |
|---|---|---|
| CN | 202309887 U | 7/2012 |
| WO | 2018035318 A1 | 2/2018 |

*Primary Examiner* — Asmamaw G Tarko

(57) ABSTRACT

Techniques for reconfiguring a second camera based on a first camera are provided. An event of interest is identified at a first camera using a first analytic. The event of interest occurring in a portion of a field of view of the first camera. A second camera whose field of view includes at least a portion of the event of interest in a field of view of the second camera is identified. It is determined that the second camera is equipped with a second analytic, the second analytic not currently operating on the at least a portion of the event of interest in the field of view of the second camera. The second camera is reconfigured to perform the second analytic on the at least the portion of the event of interest in the field of view of the second camera.

20 Claims, 5 Drawing Sheets

(56) References Cited

U.S. PATENT DOCUMENTS

| | | | | |
|---|---|---|---|---|
| 2013/0088600 A1* | 4/2013 | Wu | H04N 19/463 | 348/149 |
| 2013/0271598 A1* | 10/2013 | Mariadoss | H04N 21/6175 | 348/207.1 |
| 2013/0322687 A1* | 12/2013 | Kritt | H04N 7/181 | 382/103 |
| 2014/0085480 A1* | 3/2014 | Saptharishi | G06V 20/52 | 348/159 |
| 2016/0100134 A1 | 4/2016 | Hinkel | | |
| 2016/0148072 A1* | 5/2016 | Chan | G06V 20/54 | 382/104 |
| 2017/0034572 A1* | 2/2017 | Marlatt | G06F 16/128 | |
| 2018/0005045 A1* | 1/2018 | Kawano | G06V 20/53 | |
| 2018/0157939 A1* | 6/2018 | Butt | G06V 10/454 | |
| 2018/0211117 A1* | 7/2018 | Ratti | G06V 10/764 | |
| 2018/0262724 A1* | 9/2018 | Ross | G06V 20/40 | |
| 2018/0336687 A1* | 11/2018 | Mudretsov | G06T 7/246 | |
| 2019/0325559 A1* | 10/2019 | Hsu | G06T 5/77 | |
| 2019/0347487 A1* | 11/2019 | Booth | G06V 10/96 | |
| 2020/0257892 A1* | 8/2020 | Agarwal | G06V 40/172 | |
| 2021/0235015 A1* | 7/2021 | Hormozdyaran | H04N 7/183 | |
| 2021/0364356 A1* | 11/2021 | Stewart | G06V 10/76 | |
| 2021/0380138 A1* | 12/2021 | Kucharski | G08B 21/02 | |
| 2022/0189266 A1* | 6/2022 | Millar | G06V 20/53 | |
| 2022/0272255 A1* | 8/2022 | Xiong | H04N 23/695 | |
| 2023/0069020 A1* | 3/2023 | Leginusz | G07B 15/02 | |
| 2023/0076410 A1* | 3/2023 | Tran | G03B 17/561 | |
| 2023/0316727 A1* | 10/2023 | Roche | G06V 10/25 | 382/105 |
| 2024/0196107 A1* | 6/2024 | Lim | H04N 23/90 | |

* cited by examiner

_400_

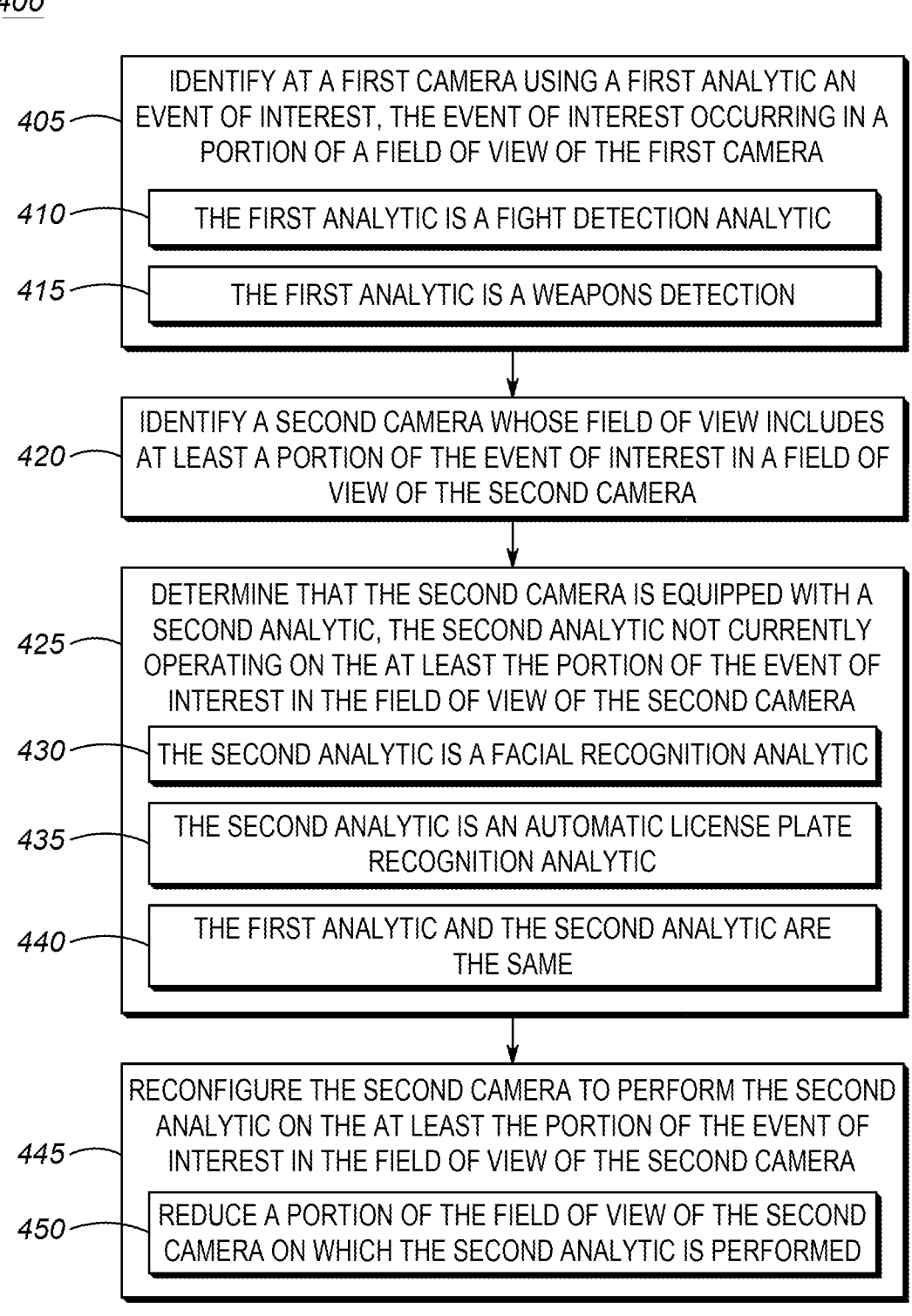

405 — IDENTIFY AT A FIRST CAMERA USING A FIRST ANALYTIC AN EVENT OF INTEREST, THE EVENT OF INTEREST OCCURRING IN A PORTION OF A FIELD OF VIEW OF THE FIRST CAMERA

410 — THE FIRST ANALYTIC IS A FIGHT DETECTION ANALYTIC

415 — THE FIRST ANALYTIC IS A WEAPONS DETECTION

420 — IDENTIFY A SECOND CAMERA WHOSE FIELD OF VIEW INCLUDES AT LEAST A PORTION OF THE EVENT OF INTEREST IN A FIELD OF VIEW OF THE SECOND CAMERA

425 — DETERMINE THAT THE SECOND CAMERA IS EQUIPPED WITH A SECOND ANALYTIC, THE SECOND ANALYTIC NOT CURRENTLY OPERATING ON THE AT LEAST THE PORTION OF THE EVENT OF INTEREST IN THE FIELD OF VIEW OF THE SECOND CAMERA

430 — THE SECOND ANALYTIC IS A FACIAL RECOGNITION ANALYTIC

435 — THE SECOND ANALYTIC IS AN AUTOMATIC LICENSE PLATE RECOGNITION ANALYTIC

440 — THE FIRST ANALYTIC AND THE SECOND ANALYTIC ARE THE SAME

445 — RECONFIGURE THE SECOND CAMERA TO PERFORM THE SECOND ANALYTIC ON THE AT LEAST THE PORTION OF THE EVENT OF INTEREST IN THE FIELD OF VIEW OF THE SECOND CAMERA

450 — REDUCE A PORTION OF THE FIELD OF VIEW OF THE SECOND CAMERA ON WHICH THE SECOND ANALYTIC IS PERFORMED

_FIG. 4_

SYSTEM AND METHOD FOR RECONFIGURING A SECOND CAMERA BASED ON A FIRST CAMERA

BACKGROUND

The presence of cameras of all types in public is ever increasing. There are fixed video cameras that may be installed by governments, businesses, and private citizens. There may be mobile cameras, such as dashboard cameras that may be installed in vehicles, such as law enforcement vehicles, commercial vehicles, and private vehicles. There can additionally be cameras associated with individuals. Law enforcement officials may wear purpose built body worn cameras. In addition, the presence of devices, such as smartphones, that include cameras has become ubiquitous. It should be readily understood that the trend of ever-increasing numbers of cameras in public is not likely to reverse.

In addition to the ever-increasing numbers of cameras, the capabilities of those cameras is always improving. Each new generation of cameras introduces improved resolutions, low light capture, etc. In addition, the field of video analytics is always improving. There are currently video analytics available for object detection, person detection, weapons detection, unusual motion detection, facial recognition, and many other types of video analytics. In some cases, these analytics are performed on the camera itself while in other cases the camera may send a video feed to a cloud based system to perform video analytics.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 4 is an example flow chart of an implementation of the reconfiguring a second camera based on a first camera techniques described herein.

Figure 1:
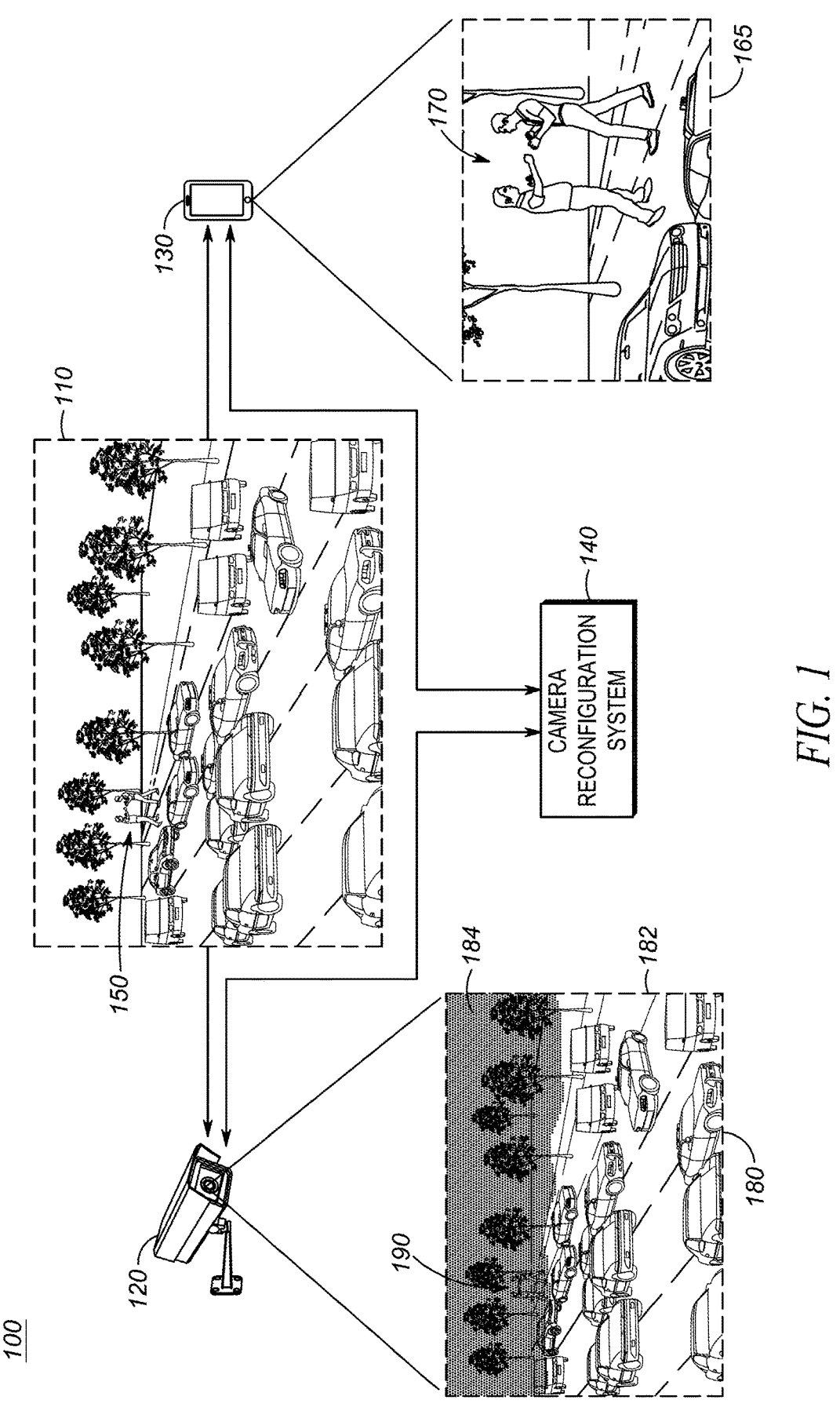
FIG. 1 is an example of an environment that may utilize the reconfiguring a second camera based on a first camera techniques described herein just prior to reconfiguration.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As mentioned above, video analytics may be run on the video captured by a camera. In some cases, the video analytics are performed on the camera itself. In other cases, the video stream from the camera may be sent to a cloud-computing environment, and the video analytics processing is done in the cloud. As video analytics become ever more sophisticated, the processing power required to run the video analytics is always increasing. For example, many video analytics are performed using Artificial Intelligence (AI) Neural Networks, or other trained AI models, to perform the analytics. These models either may require a powerful processor in the camera itself (when analytics are performed in the camera) or may require a large amount of processing power in the cloud (when the analytics are performed in the cloud).

A problem arises in that the additional processing power needed to run sophisticated video analytics comes with a price. In general, greater processing power comes with greater cost. For example, to perform on camera video analytics, the camera may need to be equipped with very powerful processing resources. The more powerful the resources, the greater the cost, thus increasing the cost of the camera overall. Even when the video analytics processing is done in the cloud, this can cause cloud-computing expenses to increase. Use of cloud resources is generally charged by the amount of processing power used. Thus more processing results in increased costs.

As a partial solution to this problem, cameras may be configured to only perform video analytics on a portion of their field of view. For example, consider a scene that includes a field of grass with a small pond in the center. Now consider a facial recognition video analytic performed on this scene. The most likely places for people, who have faces, to be would be in the field of grass. It would be very unlikely that there would be a person standing in the middle of the pond, so processing power for facial recognition could be reduced by masking the area including the pond so that video analytics (e.g. facial recognition, etc.) is not performed in the masked portion. By reducing the total area on which the facial recognition video analytic is performed, this has the side effect of reducing the total amount of processing power needed. The cost of the camera (when processing is done in the camera) can be reduced or the expense for cloud computing resources (when processing is done in the cloud) can be reduced because of the reduction in needed processing power.

However, a problem arises in that although it is unlikely that a particular video analytic would be needed in a masked portion of the field of view, this is not the same as saying it would never be needed. For example, in the scenario above, consider a person going into the pond in a rowboat. Because the pond is a masked area, facial recognition would not be performed, despite the fact that there is a person who has a face that could be recognized currently on the pond.

The techniques described herein solve this problem individually and collectively. A first camera may use a video analytic to identify an event of interest occurring in the field of view of the first camera. In the example above, the event of interest may be the person launching the rowboat into the pond and the analytic used may be a person detection video analytic. A second camera whose field of view includes a portion of the field of view of the first camera may be identified. In the example presented, the second camera field of view may cover the grass field as well as the pond.

It may then be determined that the second camera is equipped with a second analytic that is not currently operating on the event of interest in the field of view of the second camera. In accordance with the example presented above, the pond may be masked such that facial recognition is not performed in the area of the pond. The second camera may then be reconfigured to perform the second analytic on the portion of field of view that includes the event of interest. In the example provided above, the second camera may then unmask the pond area, and begin to perform facial recognition within the previously masked pond area.

A method is provided. The method includes identifying at a first camera using a first analytic an event of interest, the event of interest occurring in a portion of a field of view of the first camera. The method further includes identifying a second camera whose field of view includes at least a portion of the event of interest in a field of view of the second camera. The method further includes determining that the second camera is equipped with a second analytic, the second analytic not currently operating on the at least the portion of the event of interest in the field of view of the second camera. The method further includes reconfiguring the second camera to perform the second analytic on the at least the portion of the event of interest in the field of view of the second camera.

In one aspect the method further comprises reducing a portion of the field of view of the second camera on which the second analytic is performed.

A system is provided. The system includes a processor and a memory coupled to the processor. The memory contains a set of instructions thereon that when executed by the processor cause the processor to identify at a first camera using a first analytic an event of interest, the event of interest occurring in a portion of a field of view of the first camera. The instructions further cause the processor to identify a second camera whose field of view includes at least a portion of the event of interest in a field of view of the second camera. The instructions further cause the processor to determine that the second camera is equipped with a second analytic, the second analytic not currently operating on the at least the portion of the event of interest in the field of view of the second camera. The instructions further cause the processor to reconfigure the second camera to perform the second analytic on the at least the portion of the event of interest in the field of view of the second camera.

In one aspect, the instructions further cause the processor to reduce a portion of the field of view of the second camera on which the second analytic is performed.

A non-transitory processor readable medium containing a set of instructions thereon is provided. The instructions on the medium that when executed by a processor cause the processor to identify at a first camera using a first analytic an event of interest, the event of interest occurring in a portion of a field of view of the first camera. The instructions on the medium further cause the processor to identify a second camera whose field of view includes at least a portion of the event of interest in a field of view of the second camera. The instructions on the medium further cause the processor to determine that the second camera is equipped with a second analytic, the second analytic not currently operating on the at least the portion of the event of interest in the field of view of the second camera. The instructions on the medium further cause the processor to reconfigure the second camera to perform the second analytic on the at least the portion of the event of interest in the field of view of the second camera.

In one aspect, the instructions on the medium further cause the processor to reduce a portion of the field of view of the second camera on which the second analytic is performed.

In one aspect, the first analytic and the second analytic are the same. In one aspect, the first analytic is a fight detection analytic. In one aspect, the second analytic is a facial recognition analytic. In one aspect, the first analytic is a weapons detection analytic. In one aspect, the second analytic is an automatic license plate recognition analytic.

Further advantages and features consistent with this disclosure will be set forth in the following detailed description, with reference to the figures.

FIG. 1 is an example of an environment 100 that may utilize the reconfiguring a second camera based on a first camera techniques described herein just prior to reconfiguration. The environment may include an area under video surveillance 110, a first camera 130, a second camera 120, and a camera reconfiguration system 140.

In the example presented, the area under video surveillance 110 may be a parking lot. As shown, the parking lot includes a portion where cars are parked. The area under surveillance also includes a wooded area, where parked cars are not expected.

The second camera 120 may be a camera that is running a video analytic. For example, the second camera may be a fixed camera mounted in such a way as to have a field of view 180 that includes the entirety of the area under surveillance 110. In some implementations, the second camera may perform video analytics using processing power of the camera itself. In other implementations, the second camera may stream the captured video to a cloud computing system, and the video analytics may be performed using cloud-processing power.

As explained above, to reduce processing power (or other factors such as speed of detection, latency, etc.) it may be determined that certain portions of the field of view of the second camera 120 should be masked, such that video analytics are not performed. As shown in the field of view 180 of the second camera, video analytics are only performed on the portion of the field of view where cars are present 182. The rest of the field of view as indicated by the hash marks 184, is masked, such that the video analytics are not performed in that portion of the field of view.

The first camera 130 may be a camera that is also pointing at the area under video surveillance 110. In the example shown in FIG. 1, the first camera may be a mobile camera such as a smartphone. It should be understood that the first camera could be any type of camera, including a fixed camera. What should be understood is that the first camera captures at least a portion of the area under surveillance.

The first camera 130 may also be running a video analytic. In some implementations, the video analytic is run on the first camera itself. In other implementations, the video captured by the first camera is streamed to a cloud-computing environment and the video analytic is performed using cloud-computing resources. Although it would be possible to perform video analytics on a portion of the field of view 165 of the first camera, for ease of description, it is assumed that the video analytic on the field of view of the first camera is performed on the entire field of view of the first camera.

Camera reconfiguration system 140 may be a system that is able to receive results from video analytics performed by cameras connected to it. The camera reconfiguration system may also be able to reconfigure the portions of the field of view of a camera where analytics are performed. For example, camera reconfiguration system 140 may include a video management system that is operatively coupled to many different cameras. The camera reconfiguration system may be responsible for configuring those cameras, receiving results of analytics from those cameras, and storing the video received from those cameras. An example of a device that may implement the camera reconfiguration system is described with respect to FIG. 5.

The particular form of the camera reconfiguration system 140 is relatively unimportant. What should be understood is that the camera reconfiguration system can identify, via a video analytic performed by on the images captured by the camera, that there is an event of interest occurring in the field of view of a first camera and that event of interest is also in the field of view of a second camera. The camera reconfiguration system is able to determine that the second camera is equipped with a second analytic, but that the second analytic is not currently running on the portion of the field of view of the second camera that includes the event of interest. The camera reconfiguration system is able to reconfigure the portion of the field of view of the second camera where the second analytic is performed to include the event of interest using known techniques that may be specific to the type of camera connected.

In operation, assume that first camera 130 is equipped to run a fight detection video analytic. In other words, a video analytic is performed on the field of view of the first camera that detects persons engaging in fights. As explained above, the video analytic may be performed either in the camera itself or in a cloud-computing environment. For purposes of the remainder of this disclosure, running a video analytic on a camera means that the video analytic could be performed on the camera itself or in the cloud.

As shown in the area under surveillance 110, there is a fight 150 occurring in the portion of the parking lot where there are trees. The first camera's field of view 165 may include the fight. The fight detection video analytic running on the first camera 130 may detect the fight 170. In some cases, the detection of the fight may be indicated by forming a bounding box around the portion of the field of view that includes the fight.

The first camera 130 may then send the detection of the fight 170 to the camera reconfiguration system 140. The camera reconfiguration system 140 may determine that there is another camera, second camera 120, whose field of view 180 includes the same fight 190 that was detected by the first camera. The camera reconfiguration system may then determine that the second camera is currently not performing video analytics 184 on the portion of the field of view that includes the fight. For example, the second camera may currently be performing a facial recognition video analytic on only a portion 182 of the field of view 180.

Figure 2:
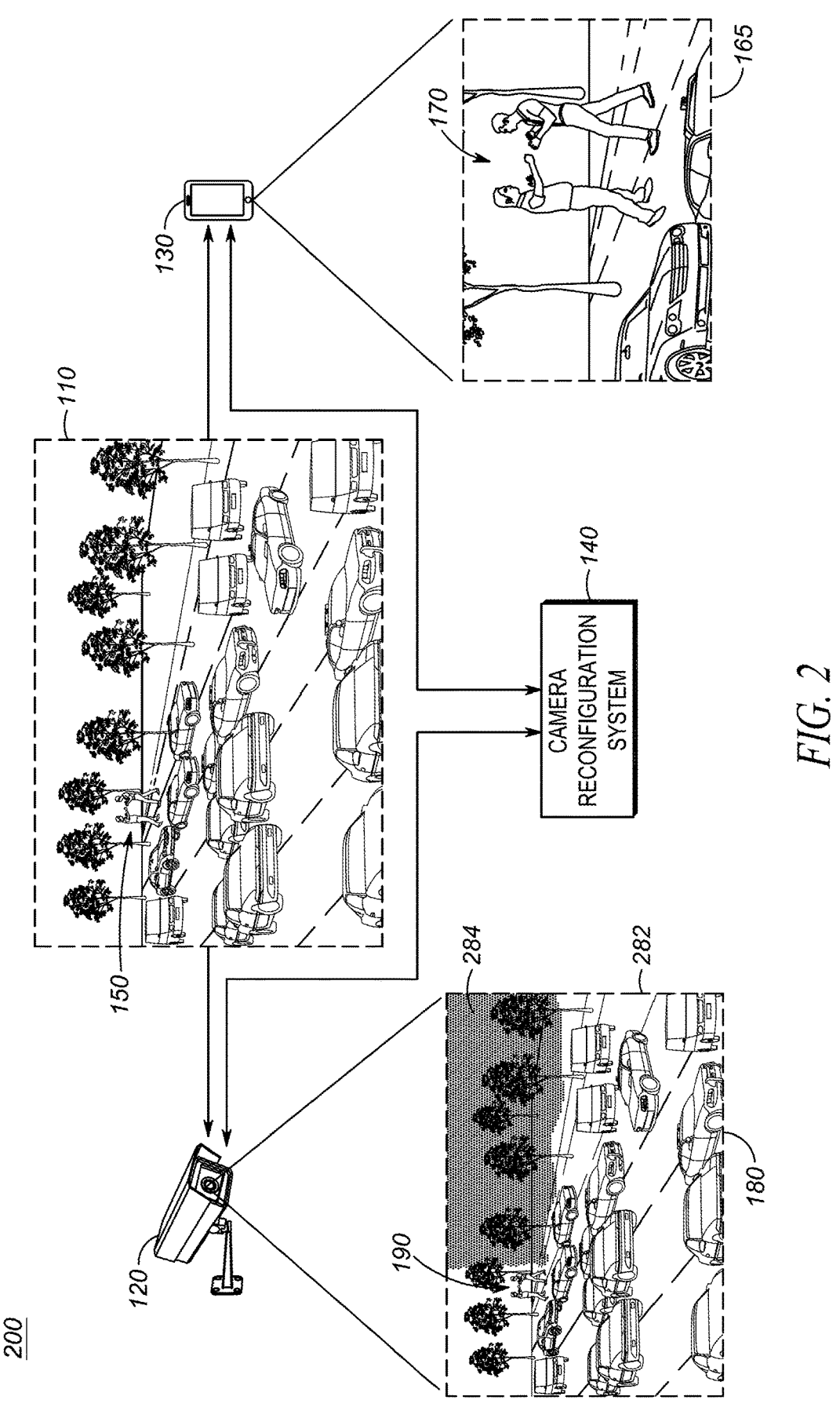
FIG. 2 is an example of an environment that may utilize the reconfiguring a second camera based on a first camera techniques described herein once reconfigured.

FIG. 2 is an example of an environment 200 that may utilize the reconfiguring a second camera based on a first camera techniques described herein once reconfigured. The camera reconfiguration system 140, upon determination that the second camera 120 is not currently performing video analytics on the portion of the field of view 180 that includes the fight may cause reconfiguration of that portion of the field of view.

In the present example, the camera reconfiguration system 140 may alter the portions of the field of view of the second camera where analytics are performed 282 to include the area where the fight was detected. For example, the camera reconfiguration system 140 may receive the location within the field of view 110 where the fight 150 occurred from the first camera 130. This indication could be via a bounding box, pixel coordinates, or any other technique to identify where in the field of view the event of interest (e.g. the fight, etc. has occurred).

As shown, the camera reconfiguration system 140 may then reconfigure the portion of the field of view 180 where video analytics are performed 282 to include the portion of the field of view that includes the fight. Facial recognition analytics could then be performed on that area of the field of view that includes the fight to identify the people involved in the fight via the facial recognition video analytic. The analytic would still not be performed in the remaining portion 284 of the field of view.

Figure 3:
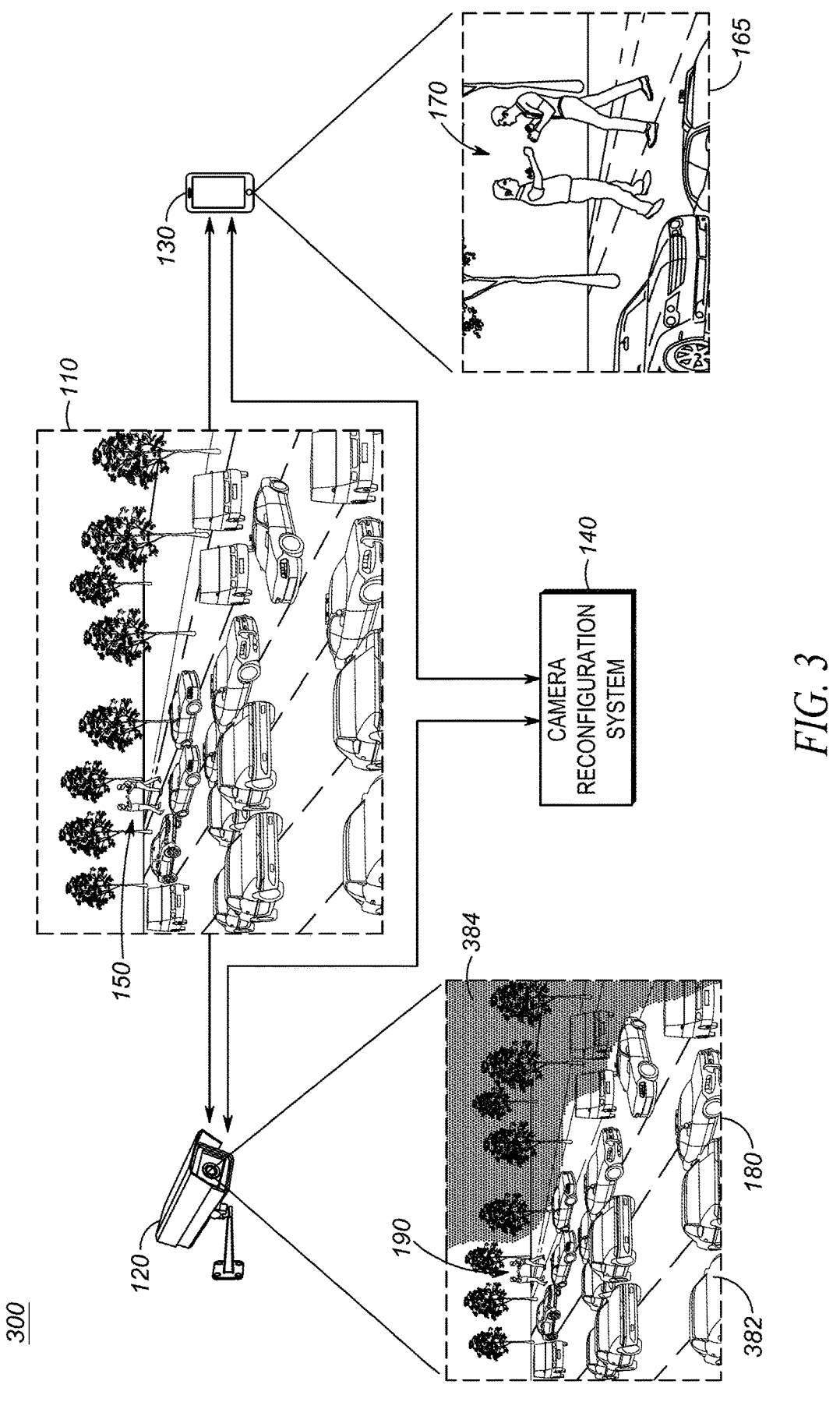
FIG. 3 is an example of an environment that may utilize the reconfiguring a second camera based on a first camera techniques described herein once reconfigured with respect to maintaining stable processing power.

FIG. 3 is an example of an environment 300 that may utilize the reconfiguring a second camera based on a first camera techniques described herein once reconfigured with respect to maintaining stable processing power. As described with respect to FIG. 2, the second camera 120 may be reconfigured by the camera reconfiguration system 140 to expand the area where video analytics are executed to include the newly detected event of interest. However, simply expanding the area of coverage may not be feasible. As explained above, in some cases the area over which video analytics is performed is limited by the processing power of the camera. In such cases, there may be no additional processing power available to expand coverage. Even in the case where the video analytics are performed in the cloud, the additional processing resources, although available, may cause increased resource utilization, and accordingly, increased cost.

This problem may be overcome by reducing the area where video analytics are performed. As shown in FIG. 3, the camera reconfiguration system 140 may reconfigure camera 120 such that the portion of the field of view 180 that is having video analytics performed 282 is increased to cover the fight 190. At the same time, the portion of the field of view that is not having video analytics performed 384 is increased. In other words, there is a tradeoff between adding portions of the field of view to start performing video analytics and subtracting portions of the field of view where analytics were previously performed. In one example implementation, any increased area of performing video analytics must be offset by an equivalent area of reduction in video analytics.

FIGS. 1, 2, and 3 was described in terms of a fixed camera and a mobile camera, running facial recognition video analytics and fight detection video analytics respectively. It should be understood that this was for ease of description only, and not by way of limitation. The techniques described herein are not limited to any particular types of cameras or any particular video analytics. Any currently available or later developed cameras and video analytics are suitable for use with the techniques described herein. What should be understood is that an event of interest is detected by video analytics of one camera and it is determined that a second camera is not currently performing a video analytic that is capable of on the portion of the field of view that includes the event of interest. The second camera can be reconfigured to begin performing the video analytic on the previously excluded portion of the field of view.

It should also be understood that although the examples presented above were in terms of two separate types of analytics, the techniques described herein are not so limited. For example, the video analytic running on both cameras may have been facial recognition analytics. However it is possible that the second camera 120 is equipped with better or more accurate facial recognition techniques. As such, it would still be beneficial to cause the second camera to perform facial recognition on the previously masked area.

It should also be understood that although the examples presented above was in terms of the second analytic already being performed on the second camera prior to reconfiguration, the techniques described herein are not so limited. For example, the second camera may have been performing ALPR on a portion of the field of view of the second camera when the fight is detected. The second camera may be equipped with a facial recognition analytic, but it is not currently running on any portion of the field of view of the second camera. The reconfiguration of the second camera could include beginning to perform facial recognition on the portion of the field of view of the second camera that includes the event of interest.

FIG. 4 is an example flow chart 400 of an implementation of the reconfiguring a second camera based on a first camera techniques described herein. In block 405, an event of interest can be identified at a first camera using a first analytic. The event of interest occurs in a portion of a field of view of the first camera. Any type of analytics, including video analytics, can be used to detect any event of interest. The particular form of analytic, so long as it is able to detect an event of interest within the field of view of the first camera, would be suitable.

In block 410, one example of a first analytic is that the first analytic is a fight detection analytic. For example, the first camera may be running a video analytic that is used to detect fights between people. A fight between two people may be detected within the field of view of the first camera. Although a video analytic to detect fights is mentioned, it should be understood that the techniques described herein are not so limited.

In block 415, another example of a first analytic may be a weapons detection analytic. The weapons detection analytic may allow the first camera to detect the presence of weapons (e.g. guns, knives, etc.). Although two examples of analytics are provided, it should be understood that the techniques described herein are not so limited. Any currently available or later developed analytic that is able to detect events of interest within the field of view of the first camera are suitable for use with the techniques described herein.

In block 420, a second camera whose field of view includes at least a portion of the event of interest in a field of view of the second camera is identified. In other words, a second camera is identified where the event of interest previously identified is also captured. Only a portion of the event of interest needs to be captured by the second camera. In other words, the field of views of the first camera and the second camera need not be the same.

In block 425, it may be determined that the second camera is equipped with a second analytic. The second analytic may not currently be operating on the at least a portion of the event of interest in the field of view of the second camera. In other words, the second camera may run a second analytic, but the portion of the field of view including the event of interest is currently masked (e.g. the second analytic does not run on the portion of the field of view including the event of interest, etc.). As explained, the reason for the exclusion may be due to limited available processing power on a camera, reduced price of the camera, reduced cloud processing costs, etc. What should be understood is that the second analytic is not being performed on the event of interest in the field of view of the second camera.

In block 430, an example second analytic may be a facial recognition analytic. A facial recognition analytic may be an analytic that can analyze a human face to determine the identity of the person to whom the face belongs. This identification may be used for later follow up (e.g. apprehend a person committing a crime, etc.). The particular facial recognition analytic used is relatively unimportant. Any currently available or later developed facial recognition algorithm would be suitable for use with the techniques described herein.

In block 435, an example second analytic may be an automatic license plate recognition (ALPR) analytic. ALPR analytics allow a camera to detect a license plate and perform optical character recognition (OCR) on the license plate to convert the image to text. The text based license plate may then be used to query a database to determine if the vehicle associated with the license plate is of interest (e.g. stolen, on a list for repossession, etc.). Just as above with respect to the first analytic, although two example second analytics are provided, the techniques described herein are no so limited. Any currently available or later developed type of analytics would be suitable for use with the techniques described herein.

In block 440, the first analytic and the second analytic are the same. Although in the examples provided thus far the first analytic on the first camera (e.g. fight detection) is different than the second analytic on the second camera (e.g. facial recognition) this was for purposes of ease of explanation rather than by way of limitation. In some cases, the first analytic and the second analytic may be the same. For example, the first and second analytics may both be facial recognition analytics. Because each of the cameras may have a different field of view, the face as it appears in the field of view of each camera may be slightly different. This difference may cause the accuracy of the facial recognition analytic of one camera to be better than the other camera. What should be understood is that the techniques described herein are not limited to the first and second analytic being different.

In block 445, the second camera may be reconfigured to perform the second analytic on the at least the portion of the event of interest in the field of view of the second camera. In other words, the masked portion of the field of view of the second camera may be removed so that the second video analytic is performed on the event of interest. As would be expected, this would cause an increase in processing power (either on the camera or in the cloud) to perform the second video analytic on the previously masked portion.

In block 450, a portion of the field of view of the second camera on which the second analytic is performed may be reduced. As mentioned above, unmasking a portion of the field of view of the second camera to cause the second video analytic to operate on that portion may cause an increase in processing power needed. In some cases, the additional processing power may simply not be available (e.g. processing done on the camera and the camera processor was already operating at the peak of its capabilities). In other cases, such as processing done in the cloud, the camera operator may not wish to pay for additional cloud processing resources. To overcome this problem, a portion of the field of view of the second camera where the second analytic is performed may be reduced by masking that portion. In some implementations, the amount of reduction may be proportional to the area where the second analytic is now being performed (e.g. the unmasked area, etc.).

Figure 5:
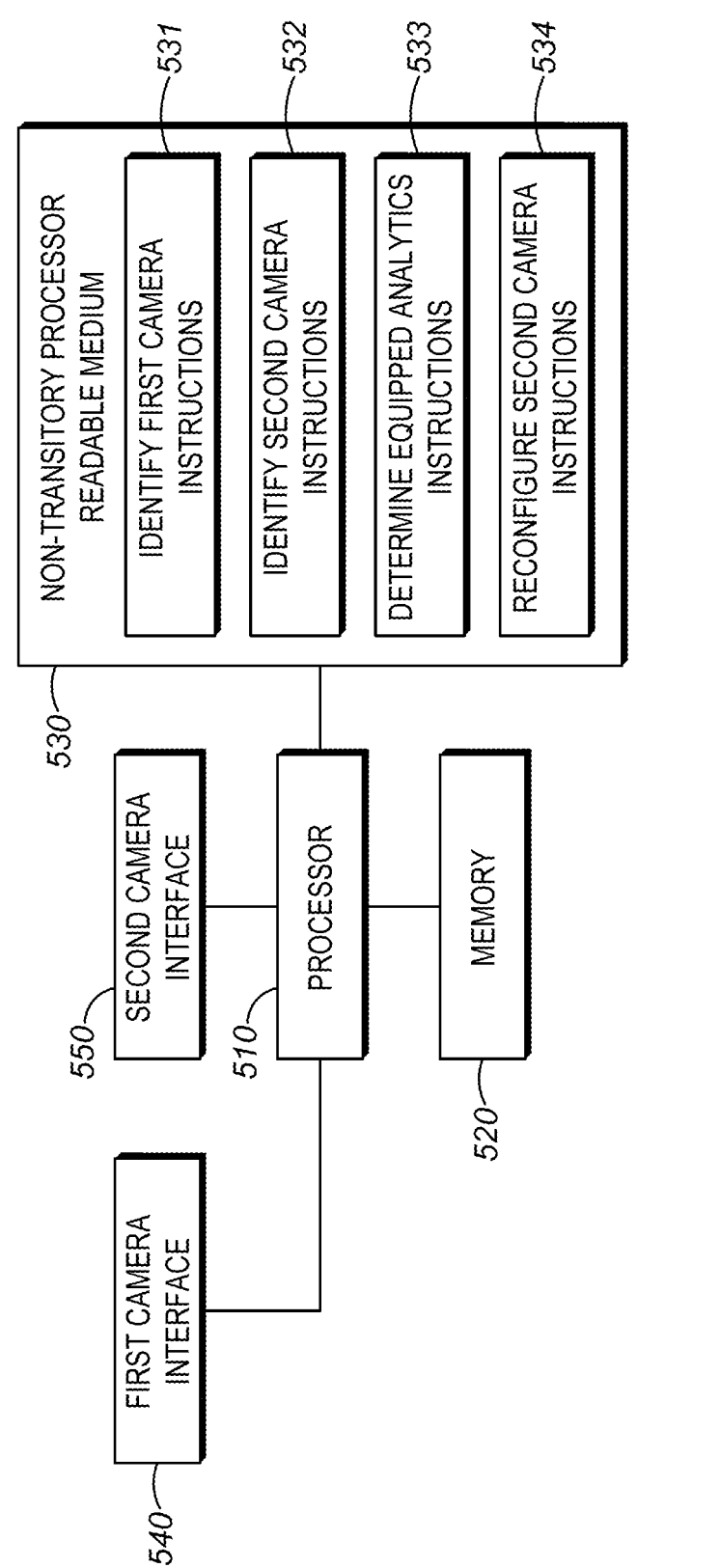
FIG. 5 is an example of a device that may implement the reconfiguring a second camera based on a first camera techniques described herein.

FIG. 5 is an example of a device 500 that may implement the reconfiguring a second camera based on a first camera techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, field of view detection, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, first camera interface 540, and second camera interface 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include identify first camera instructions 531. The identify first camera instructions 531 may cause the processor to utilize the first camera interface 540 to communicate with a first camera to identify an analytic event of interest occurring within a portion of the field of view of the first camera. The identify first camera instructions 531 are described throughout the specification generally, including places such as blocks 405-415.

The medium 530 may include identify second camera instructions 532. The identify second camera instructions 532 may cause the processor to utilize the second camera interface 550 to identify and communicate with a second camera whose field of view includes at least a portion of the field of view of the first camera. The identify second camera instructions 532 are described throughout the specification generally, including places such as block 420.

The medium 530 may include determine equipped analytics instructions 533. The determine equipped analytics instructions 533 may cause the processor to determine that a second analytic is not currently operating on the field of view of the second camera that includes the event of interest. The determine equipped analytics instructions 533 are described throughout the specification generally, including places such as blocks 425-440.

The medium 530 may include reconfigure second camera instructions 534. The reconfigure second camera instructions 534 may cause the processor to utilize the second camera interface 550 to reconfigure the second camera to perform the second analytic on the at least a portion of the field of view that includes the event of interest. The reconfigure second camera instructions 534 are described throughout the specification generally, including places such as blocks 445 and 450.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot directly interface with a camera to reconfigure the camera to perform a second analytic, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

identifying at a first camera using a first analytic an event of interest, the event of interest occurring in a portion of a field of view of the first camera;

identifying a second camera whose field of view includes at least a portion of the event of interest in a field of view of the second camera;

determining that the second camera is equipped with a second analytic, the second analytic being performed on a portion of the field of view of the second camera, the second analytic not currently operating on a masked portion of the field of view of the second camera, wherein the masked portion of the field of view of the second camera includes the at least the portion of the event of interest in the field of view of the second camera; and reconfiguring the second camera to perform the second analytic on the at least the portion of the event of interest in the field of view of the second camera.

2. The method of claim 1 where the first analytic and the second analytic are the same.

3. The method of claim 1 further comprising:

reducing a portion of the field of view of the second camera on which the second analytic is performed.

4. The method of claim 1 wherein the first analytic is a fight detection analytic.

5. The method of claim 1 wherein the second analytic is a facial recognition analytic.

6. The method of claim 1 wherein the first analytic is a weapons detection analytic.

7. The method of claim 1 wherein the second analytic is an automatic license plate recognition analytic.

8. A system comprising:

a processor; and a memory coupled to the processor, the memory containing a set of instructions thereon that when executed by the processor cause the processor to:

identify at a first camera using a first analytic an event of interest, the event of interest occurring in a portion of a field of view of the first camera;

identify a second camera whose field of view includes at least a portion of the event of interest in a field of view of the second camera;

determine that the second camera is equipped with a second analytic, the second analytic being performed on a portion of the field of view of the second camera, the second analytic not currently operating on a masked portion of the field of view of the second camera, wherein the masked portion of the field of view of the second camera includes the at least the portion of the event of interest in the field of view of the second camera; and reconfigure the second camera to perform the second analytic on the at least the portion of the event of interest in the field of view of the second camera.

9. The system of claim 8 where the first analytic and the second analytic are the same.

10. The system of claim 8 further comprising instructions that cause the processor to:

reduce a portion of the field of view of the second camera on which the second analytic is performed.

11. The system of claim 8 wherein the first analytic is a fight detection analytic.

12. The system of claim 8 wherein the second analytic is a facial recognition analytic.

13. The system of claim 8 wherein the first analytic is a weapons detection analytic.

14. The system of claim 8 wherein the second analytic is an automatic license plate recognition analytic.

15. A non-transitory processor readable medium containing a set of instructions thereon that when executed by a processor cause the processor to:

identify at a first camera using a first analytic an event of interest, the event of interest occurring in a portion of a field of view of the first camera;

identify a second camera whose field of view includes at least a portion of the event of interest in a field of view of the second camera;

determine that the second camera is equipped with a second analytic, the second analytic being performed on a portion of the field of view of the second camera, the second analytic not currently operating on a masked portion of the field of view of the second camera, wherein the masked portion of the field of view of the second camera includes the at least the portion of the event of interest in the field of view of the second camera; and reconfigure the second camera to perform the second analytic on the at least the portion of the event of interest in the field of view of the second camera.

16. The medium of claim 15 where the first analytic and the second analytic are the same.

17. The medium of claim 15 further comprising instructions that cause the processor to:

reduce a portion of the field of view of the second camera on which the second analytic is performed.

18. The medium of claim 15 wherein the first analytic is a fight detection analytic.

19. The medium of claim 15 wherein the second analytic is a facial recognition analytic.

20. The medium of claim 15 wherein the first analytic is a weapons detection analytic.

* * * * *